United States Patent
Mannai et al.

(10) Patent No.: US 12,480,389 B2
(45) Date of Patent: Nov. 25, 2025

(54) METHOD AND SYSTEM FOR OPERATING WELLS AT OPTIMUM RATES USING ORIFICE PERFORMANCE CURVES

(71) Applicant: SAUDI ARABIAN OIL COMPANY, Dhahran (SA)

(72) Inventors: Mohammed N. Mannai, Dhahran (SA); Ayedh M. Shehri, Dammam (SA); Muhammad Imran Javed, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 132 days.

(21) Appl. No.: 17/651,367

(22) Filed: Feb. 16, 2022

(65) Prior Publication Data

US 2023/0258059 A1    Aug. 17, 2023

(51) Int. Cl.
*E21B 43/12* (2006.01)
*E21B 47/06* (2012.01)

(52) U.S. Cl.
CPC ............ *E21B 43/12* (2013.01); *E21B 47/06* (2013.01)

(58) Field of Classification Search
CPC .......... E21B 47/06; E21B 43/12; E21B 43/16; G01F 1/34; G01F 1/36; G01F 1/74; G01F 1/76

See application file for complete search history.

(56) References Cited

U.S. PATENT DOCUMENTS

| | | | |
|---|---|---|---|
| 3,144,046 A * | 8/1964 | Seesselberg | E21B 43/20 137/551 |
| 4,721,158 A * | 1/1988 | Merritt, Jr. | E21B 43/16 166/305.1 |
| 6,739,359 B2 | 5/2004 | Jones et al. | |

(Continued)

FOREIGN PATENT DOCUMENTS

CN    109990849 B    6/2021

OTHER PUBLICATIONS

Popa, Andrei et al., "Continuous Steam Distribution Optimization using Pattern Recognition on High Frequency Data Streams"; Proceedings of the SPE Annual Technical Conference & Exhibition; Paper No. SPE-201427-MS; pp. 1-24; Oct. 19, 2020 (24 pages).

(Continued)

*Primary Examiner* — George S Gray
(74) *Attorney, Agent, or Firm* — Osha Bergman Watanabe & Burton LLP (57) ABSTRACT

A method for operating water wells at optimum rates involves obtaining, for each of a multitude of wells, a target rate of fluid flow, obtaining, for each target rate of fluid flow, a corresponding target differential pressure using orifice performance curves stored in a database associated with the multitude of wells, and monitoring each of the multitude of wells for noncompliance. Noncompliance is determined based on a rate deviation of an actual rate of fluid flow from the target rate of fluid flow exceeding a predetermined threshold. The rate deviation is determined based on a differential pressure deviation of a measured differential (Continued)

pressure corresponding to the actual rate of fluid flow from the target differential pressure corresponding to the target rate of fluid flow. The method further involves bringing a non-compliant well of the multitude of wells into compliance.

17 Claims, 5 Drawing Sheets

(56) References Cited

U.S. PATENT DOCUMENTS

| | | | | |
|---|---|---|---|---|
| 2002/0016679 A1* | 2/2002 | Thomas | ............... | E21B 43/00 702/14 |
| 2009/0107669 A1* | 4/2009 | Elphick | ............... | E21B 43/20 703/10 |
| 2011/0166837 A1* | 7/2011 | Servaes | ............... | E21B 10/26 703/2 |
| 2011/0301851 A1* | 12/2011 | Briers | ............... | E21B 43/16 702/12 |
| 2016/0061020 A1* | 3/2016 | Sayarpour | ............... | E21B 43/14 702/6 |
| 2018/0209248 A1* | 7/2018 | Patel | ............... | E21B 34/06 |
| 2019/0302291 A1* | 10/2019 | Lolla | ............... | G01V 1/288 |
| 2021/0123789 A1 | 4/2021 | Jamison et al. | | |

OTHER PUBLICATIONS

Wasnik, Rakesh et al., "Common Pitfalls in Selection of Restriction Orifice for Depressurization of Oil and Gas Facilities"; Proceedings of the Abu Dhabi International Petroleum Exhibition & Conference; Paper No. SPE-188211-MS; pp. 1-8; Nov. 13, 2017 (8 pages).

* cited by examiner

METHOD AND SYSTEM FOR OPERATING WELLS AT OPTIMUM RATES USING ORIFICE PERFORMANCE CURVES

BACKGROUND

Wells, e.g., water wells, may be operated at designated rates set by reservoir engineers. In other words, a reservoir engineer may establish a certain flow rate for injection or production using a well, based on what is considered optimal for that specific well. The objective of producing and/or injecting a well at an optimum rate is to prolong the well life and/or to obtain the ultimate recovery of hydrocarbons from the reservoir. In order to achieve the optimum rate, each well is assigned a target by the reservoir engineer to either produce or inject. Wells meeting this assigned target are considered "compliant" wells while wells not meeting the target, are considered "non-compliant" wells.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method for operating water wells at optimum rates, the method comprising: obtaining, for each of a plurality of wells, a target rate of fluid flow; obtaining, for each target rate of fluid flow, a corresponding target differential pressure using orifice performance curves stored in a database associated with the plurality of wells; monitoring each of the plurality of wells for noncompliance, wherein noncompliance is determined based on a rate deviation of an actual rate of fluid flow from the target rate of fluid flow exceeding a predetermined threshold, wherein the rate deviation is determined based on a differential pressure deviation of a measured differential pressure corresponding to the actual rate of fluid flow from the target differential pressure corresponding to the target rate of fluid flow; and bringing a non-compliant well of the plurality of wells into compliance.

In general, in one aspect, embodiments relate to a system for operating water wells at optimum rates, the system comprising: a well performance monitor configured to operate a plurality of wells at optimum rates, the well performance monitor comprising: a database storing a plurality of orifice performance curves for the plurality of wells; and a processor configured to: obtain, for each of the plurality of wells, a target rate of fluid flow; obtain, for each target rate of fluid flow, a corresponding target differential pressure using the plurality of orifice performance curves for the plurality of wells; monitor each of the plurality of wells for noncompliance, wherein noncompliance is determined based on a rate deviation of an actual rate of fluid flow from the target rate of fluid flow exceeding a predetermined threshold, wherein the rate deviation is determined based on a differential pressure deviation of a measured differential pressure corresponding to the actual rate of fluid flow from the target differential pressure corresponding to the target rate of fluid flow; and facilitate bringing a non-compliant well of the plurality of wells into compliance.

In general, in one aspect, embodiments relate to a non-transitory machine-readable medium comprising a plurality of machine-readable instructions executed by one or more processors, the plurality of machine-readable instructions causing the one or more processors to perform operations comprising: obtaining, for each of a plurality of wells, a target rate of fluid flow; obtaining, for each target rate, a corresponding target differential pressure using orifice performance curves stored in a database established for the plurality of wells; monitoring each of the plurality of wells for noncompliance, wherein noncompliance is determined based on a rate deviation of an actual rate of fluid flow from the target rate of fluid flow exceeding a predetermined threshold, wherein the rate deviation is determined based on a differential pressure deviation of a measured differential pressure corresponding to the actual rate of fluid flow from the target differential pressure corresponding to the target rate of fluid flow; and bringing a non-compliant well of the plurality of wells into compliance.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Wells, e.g., water wells, (injectors, disposal, supply) operate at designated rates of fluid flow which may be set by reservoir engineers. The objective of producing and injecting at optimum rates is to prolong the well life and obtain the ultimate recovery of hydrocarbons from the reservoir. In order to achieve an optimum rate, each well is assigned a target rate of fluid flow by the reservoir engineer to either produce or inject. Wells meeting this assigned target are "compliant" wells while any well that is not meeting the target, whether above or below the target, is a "non-compliant" well.

In general, embodiments of the disclosure include systems and methods for operating wells at optimum rates using orifice performance curves. In order to operate a well at an optimum rate, in one or more embodiments, the well is monitored in real-time or near-real-time using a data acquisition system (DAS). The data acquisition system may provide a measurement of a differential pressure (dP) across an orifice plate. Using an orifice performance curve corresponding to the orifice plate, the measured differential pressure may be translated to an actual rate of fluid flow. The actual rate of fluid flow may be determined in real-time or near-real time for the well. Next, based on a deviation of the actual rate of fluid flow from the target rate of fluid flow, adjustments may be made to bring the well into compliance, if it is non-compliant. The operations may be equally applicable to injection and production wells. The operations may further be centralized to streamline the optimization for multiple wells, e.g. tens, hundreds, thousands of wells.

Embodiments as disclosed may have various benefits. For example, frequent well head choke changes or, more generally, frequent trips to the well by an operator may be avoided. Specifically, the effort associated with the traditional approach of frequent rate testing and monitoring of a well after frequently needed choke changes based on a trial and error approach is reduced. For example, in one or more embodiments, a production engineer may implement a change of the target rate of fluid flow (e.g., a change for individual wells, or a global change for any number of wells), and the method as described subsequently ensures that individual wells are adjusted accordingly, without requiring the production engineer to dedicate repeated and significant attention to each individual well, and reducing the amount of communication with the well operators. Specifically referring to injection wells, embodiments of the disclosure reduce or eliminate the issue of void replacement which directly affects hydrocarbon production due to the fact that the volume of hydrocarbon produced by water through injection wells needs to be replaced. The described methods avoid non-compliant wells that would result in poor reservoir performance, including a loss of hydrocarbon reserves inside the reservoir reflecting poor recovery. A detailed description is subsequently provided.

Figure 1:
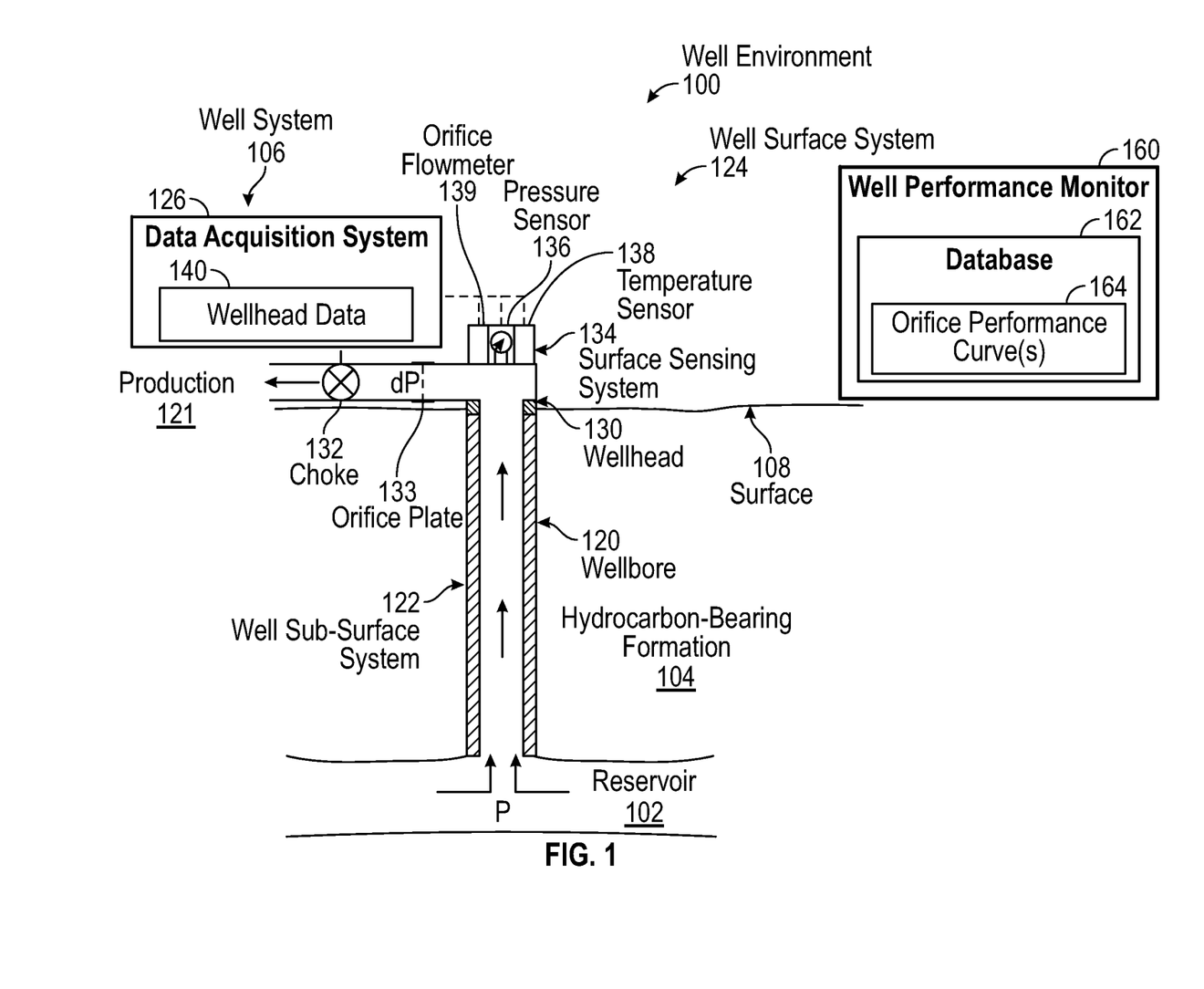
FIG. 1 shows a system in accordance with one or more embodiments.

Turning to FIG. 1, FIG. 1 shows a schematic diagram in accordance with one or more embodiments. FIG. 1 illustrates a well environment (100) that includes a hydrocarbon reservoir ("reservoir") (102) located in a subsurface hydrocarbon-bearing formation (104) and a well system (106). The hydrocarbon-bearing formation (104) may include a porous or fractured rock formation that resides underground, beneath the earth's surface ("surface") (108). In the case of the well system (106) being a hydrocarbon well, the reservoir (102) may include a portion of the hydrocarbon-bearing formation (104). The hydrocarbon-bearing formation (104) and the reservoir (102) may include different layers of rock having varying characteristics, such as varying degrees of permeability, porosity, and resistivity. In the case of the well system (106) being operated as a production well, the well system (106) may facilitate the extraction of hydrocarbons (or "production") from the reservoir (102). In the case of the well system (106) being operated as an injection well, the well system (106) may be used in a tertiary recovery method to displace the produced hydrocarbons and/or to maintain the pressure profile of the reservoir (102).

In some embodiments, the well system (106) includes a wellbore (120), a well sub-surface system (122), a well surface system (124), and a data acquisition system (126). The data acquisition system (126) may monitor and/or control various operations of the well system (106), such as well production operations, well completion operations, well maintenance operations, and reservoir monitoring, assessment and development operations. In some embodiments, the data acquisition system (126) includes a computer system that is the same as or similar to that of computer system (502) described below in FIG. 5 and the accompanying description.

The wellbore (120) may include a bored hole that extends from the surface (108) into a target zone of the hydrocarbon-bearing formation (104), such as the reservoir (102). An upper end of the wellbore (120), terminating at or near the surface (108), may be referred to as the "up-hole" end of the wellbore (120), and a lower end of the wellbore, terminating in the hydrocarbon-bearing formation (104), may be referred to as the "downhole" end of the wellbore (120). The wellbore (120) may facilitate the circulation of drilling fluids during drilling operations, the flow of hydrocarbon production ("production") (121) (e.g., oil and gas) from the reservoir (102) to the surface (108) during production operations, the injection of substances (e.g., water) into the hydrocarbon-bearing formation (104) or the reservoir (102) during injection operations, or the communication of monitoring devices (e.g., logging tools) into the hydrocarbon-bearing formation (104) or the reservoir (102) during monitoring operations (e.g., during in situ logging operations).

In some embodiments, during operation of the well system (106), the data acquisition system (126) collects and records wellhead data (140) for the well system (106) and other data regarding downhole equipment and downhole sensors. The wellhead data (140) may include, for example, a record of measurements of wellhead pressure (P) (e.g., including flowing wellhead pressure (FWHP)), wellhead temperature (T) (e.g., including flowing wellhead temperature), wellhead production rate (R) over some or all of the life of the well (106), and/or water cut data. In one or more embodiments, the wellhead data include a measured differential pressure (dP) obtained at an orifice plate as further discussed below. In some embodiments, the measurements are recorded in real-time, and are available for review or use within seconds, minutes or hours of the condition being sensed (e.g., the measurements are available within 1 hour of the condition being sensed). In such an embodiment, the wellhead data (140) may be referred to as "real-time" wellhead data (140). Real-time wellhead data (140) may enable an operator of the well to assess a relatively current state of the well system (106), and make real-time decisions regarding development of the well system (106) and the reservoir (102), such as on-demand adjustments in regulation of production flow from the well or injection flow to the well.

In some embodiments, the well surface system (124) includes a wellhead (130). The wellhead (130) may include a rigid structure installed at the "up-hole" end of the wellbore (120), at or near where the wellbore (120) terminates at the Earth's surface (108). The wellhead (130) may include structures for supporting (or "hanging") casing and production tubing extending into the wellbore (120). Production (121) may flow through the wellhead (130), after exiting the wellbore (120) and the well sub-surface system (122), including, for example, the casing and the production tubing. In some embodiments, the well surface system (124) includes flow regulating devices that are operable to control the flow of substances into and out of the wellbore (120). For example, the well surface system (124) may include one or more chokes (132) that are operable to control the flow of production (121). For example, a choke (132) may be fully opened to enable unrestricted flow of production (121) from the wellbore (120), the choke (132) may be partially opened to partially restrict (or "throttle") the flow of production (121) from the wellbore (120), and choke (132) may be fully closed to fully restrict (or "block") the flow of production (121) from the wellbore (120), and through the well surface system (124). Depending on the setting of the choke (132), different backpressures may be generated on the well sub-surface system (122).

Keeping with FIG. 1, in some embodiments, the well surface system (124) includes a surface sensing system (134). The surface sensing system (134) may include sensor devices for sensing characteristics of substances, including production (121), passing through or otherwise located in the well surface system (124). The characteristics may include, for example, pressure, temperature and flow rate of production (121) flowing through the wellhead (130), or other conduits of the well surface system (124), after exiting the wellbore (120).

In some embodiments, the surface sensing system (134) includes one or more surface pressure sensors (136) operable to sense the pressure of production (121) flowing through the well surface system (124), after it exits the wellbore (120). The surface pressure sensor (136) may include, for example, a wellhead pressure sensor that senses a pressure of production (121) flowing through or otherwise located in the wellhead (130). In some embodiments, the surface sensing system (134) includes a surface temperature sensor (138) operable to sense the temperature of production (151) flowing through the well surface system (124), after it exits the wellbore (120). The surface temperature sensor (138) may include, for example, a wellhead temperature sensor that senses a temperature of production (121) flowing through or otherwise located in the wellhead (130), referred to as "wellhead temperature" (T). In some embodiments, the surface sensing system (134) includes a flow rate sensor, e.g., an orifice flowmeter (139) operable to sense the flow rate of production (121) flowing through the well surface system (124), after it exits the wellbore (120). The orifice flowmeter (139) may include hardware that senses a flow rate of production (121) (R) passing through the wellhead (130).

In one or more embodiments, the surface sensing system (134) includes an orifice plate (133) with one or more pressure sensors (136) disposed on both sides (upstream, downstream) of the orifice plate (133). The reduced cross-sectional area of the fluid flow at the orifice plate results in an increased velocity of the fluid flow. This increase in kinetic energy is balanced by a decrease in static pressure. Accordingly, due to the energy exchange, the differential pressure (dP) before and after the orifice plate may be used to determine the rate of fluid flow. A conversion from the measured dP to the corresponding rate of fluid flow may be performed under consideration of various correction factors. To simplify the conversion between the measured dP and the rate of fluid flow, an orifice performance curve (164), specific to the orifice plate (133), may be used. An orifice performance curve accommodates the correction factors in a single curve that allows direct conversion between the measured dP and the corresponding rate of fluid flow. In combination, the orifice plate (133), the pressure sensors (136) and the orifice performance curve (164) may form the orifice flowmeter (139). The orifice performance curves (164) are discussed below in reference to FIG. 2.

Keeping with FIG. 1, when completing a well, one or more well completion operations may be performed prior to delivering the well to the party responsible for production or injection. Well completion operations may include casing operations, cementing operations, perforating the well, gravel packing, directional drilling, hydraulic stimulation of a reservoir region, and/or installing a production tree or wellhead assembly at the wellbore (120). Likewise, well operations may include open-hole completions or cased-hole completions. For example, an open-hole completion may refer to a well that is drilled to the top of the hydrocarbon reservoir. Thus, the well is cased at the top of the reservoir, and left open at the bottom of a wellbore. In contrast, cased-hole completions may include running casing into a reservoir region.

Some embodiments include perforation operations. More specifically, a perforation operation may include perforating casing and cement at different locations in the wellbore (120) to enable hydrocarbons to enter a well stream from the resulting holes. For example, some perforation operations include using a perforation gun at different reservoir levels to produce holed sections through the casing, cement, and sides of the wellbore (120). Hydrocarbons may then enter the well stream through these holed sections. In some embodiments, perforation operations are performed using discharging jets or shaped explosive charges to penetrate the casing around the wellbore (120).

In one well completion example, the sides of the wellbore (120) may require support, and thus casing may be inserted into the wellbore (120) to provide such support. After a well has been drilled, casing may ensure that the wellbore (120) does not close in upon itself, while also protecting the well stream from outside incumbents, like water or sand. Likewise, if the formation is firm, casing may include a solid string of steel pipe that is run on the well and will remain that way during the life of the well.

In another well completion, a gravel packing operation may further be performed using a gravel-packing slurry of appropriately sized pieces of coarse sand or gravel. As such, the gravel-packing slurry may be pumped into the wellbore (120) between a casing's slotted liner and the sides of the wellbore (120). The sand screen (110) and the gravel pack may filter sand and other debris that might have otherwise entered the well stream with hydrocarbons.

In another well operation example, a space between the casing and the untreated sides of the wellbore (120) may be cemented to hold a casing in place. This well operation may include pumping cement slurry into the wellbore (120) to displace existing drilling fluid and fill in this space between the casing and the untreated sides of the wellbore (120). Cement slurry may include a mixture of various additives and cement. After the cement slurry is left to harden, cement may seal the wellbore (120) from non-hydrocarbons that attempt to enter the well stream. In some embodiments, the cement slurry is forced through a lower end of the casing and into an annulus between the casing and a wall of the wellbore (120). More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

In another well completion, a wellhead assembly may be installed on the wellhead of the wellbore (120). A wellhead assembly may be a production tree (also called a Christmas tree) that includes valves, gauges, and other components to provide surface control of subsurface conditions of a well.

In some embodiments, a wellbore (120) includes one or more casing centralizers. For example, a casing centralizer may be a mechanical device that secures casing at various locations in a wellbore to prevent casing from contacting the walls of the wellbore. Thus, casing centralization may produce a continuous annular clearance around casing such that cement may be used to completely seal the casing to walls of the wellbore. Without casing centralization, a cementing operation may experience mud channeling and poor zonal isolation. Examples of casing centralizers may include bow-spring centralizers, rigid centralizers, semi-rigid centralizers, and mold-on centralizers. In particular, bow springs may be slightly larger than a particular wellbore in order to provide complete centralization in vertical or slightly deviated wells. On the other hand, rigid centralizers may be manufactured from solid steel bar or cast iron with a fixed blade height in order to fit a specific casing or hole size. Rigid centralizers may perform well even in deviated wellbores regardless of any particular side forces. Semi-rigid centralizers may be made of double crested bows and operate as a hybrid centralizer that includes features of both bow-spring and rigid centralizers. The spring characteristic of the bow-spring centralizers may allow the semi-rigid centralizers to compress in order to be disposed in tight spots in a wellbore. Mold-on centralizers may have blades made of carbon fiber ceramic material that can be applied directly to a casing surface.

In some embodiments, well intervention operations may also be performed at a well site. For example, well intervention operations may include various operations carried out by one or more service entities for an oil or gas well during its productive life (e.g., fracking operations, CT, flow back, separator, pumping, wellhead and production tree maintenance, slickline, braded line, coiled tubing, snubbing, workover, subsea well intervention, etc.). For example, well intervention activities may be similar to well completion operations, well delivery operations, and/or drilling operations in order to modify the state of a well or well geometry. In some embodiments, well intervention operations are used to provide well diagnostics, and/or manage the production of the well. With respect to service entities, a service entity may be a company or other actor that performs one or more types of oil field services, such as well operations, at a well site. For example, one or more service entities may be responsible for performing a cementing operation in the wellbore (120) prior to delivering the well to a producing entity.

Figure 2:
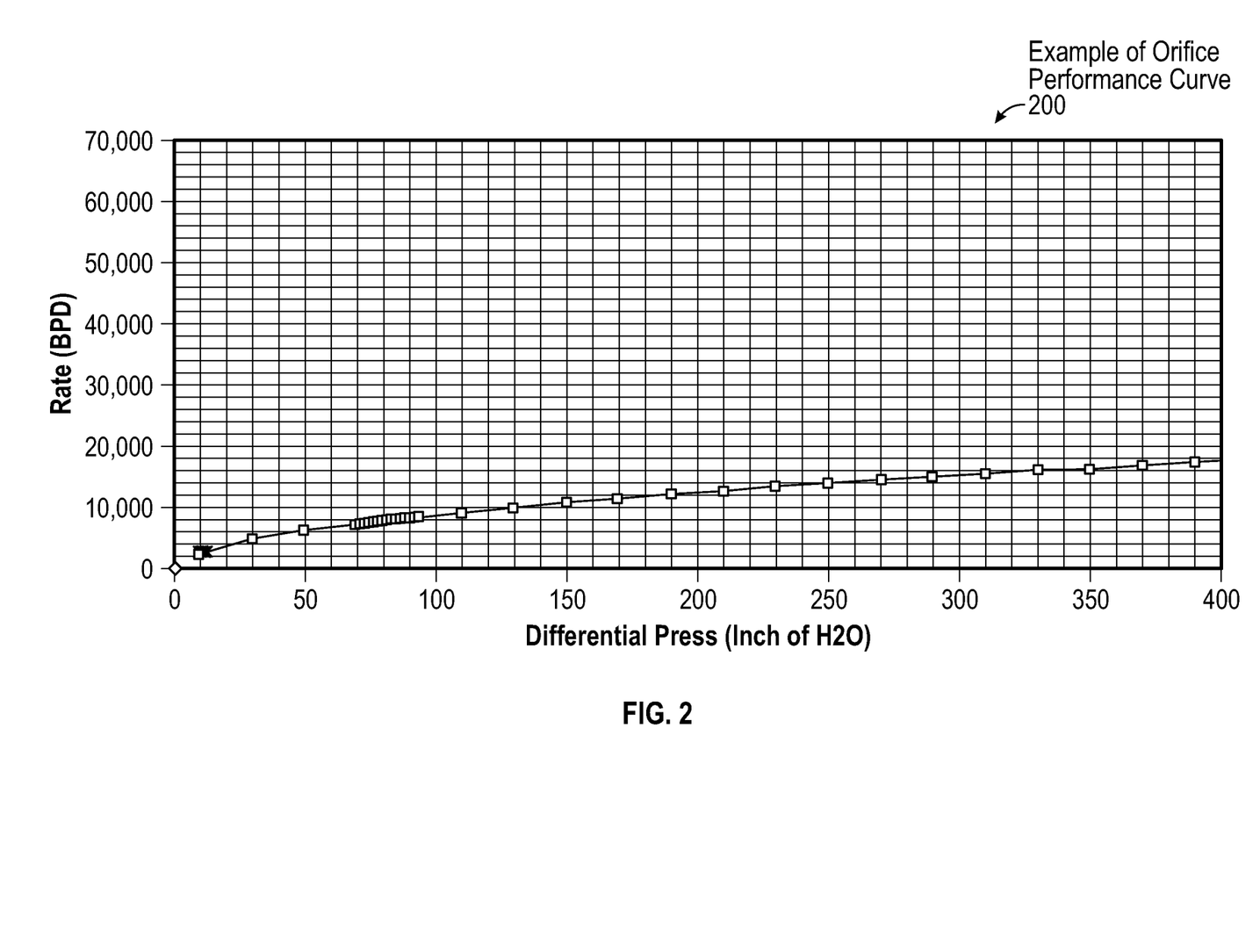
FIG. 2 shows an example of an orifice performance curve in accordance with one or more embodiments.

Turning to the well performance monitor (160), a well performance monitor (160) may include hardware and/or software with functionality for storing and analyzing well logs, production data, sensor data (e.g., from a wellhead, downhole sensor devices, or flow control devices). In one or more embodiments, the well performance monitor (160) includes a database (162) storing orifice performance curves (164). An orifice performance curve (164) as illustrated in FIG. 2 may be stored in the database (162) in various formats. In one embodiment, the equation for the orifice performance curve (162) is stored in the database (162). Alternatively, the database (162) may store corresponding discrete values of differential pressure and corresponding rate of fluid flow associated with an orifice performance curve. Alternatively, a mathematical approximation of the orifice performance curve may be stored.

Figure 3:
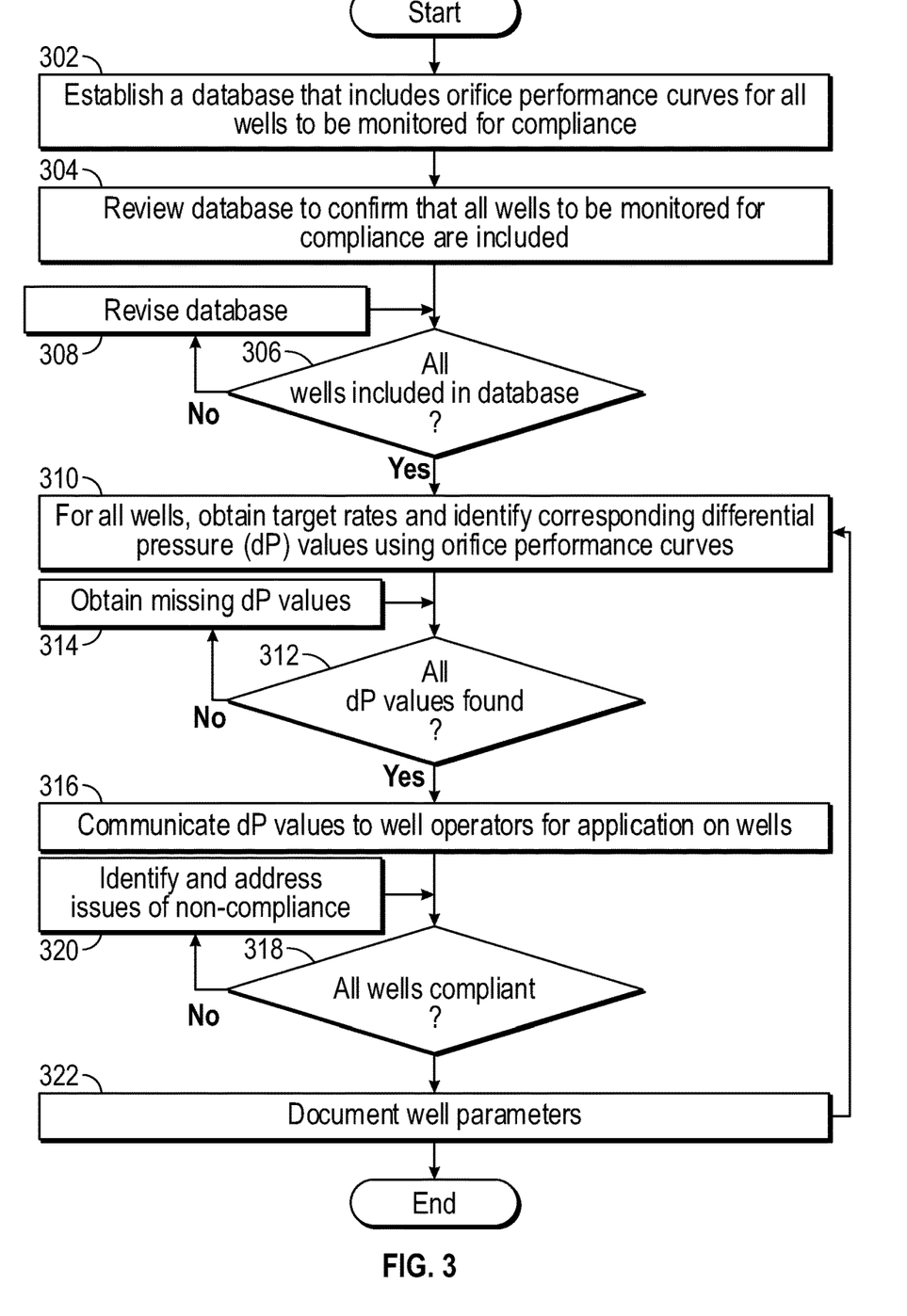
FIG. 3 shows a flowchart for a method in accordance with one or more embodiments.

In one or more embodiments, the well performance monitor (160) performs operations for methods described in reference to the flowchart of FIG. 3. Software instructions in the form of computer readable program code to perform the operations in accordance with embodiments may be stored, in whole or in part, temporarily or permanently, on a non-transitory computer readable medium.

In one or more embodiments, the well performance monitor (160) performs the operations described in the flowchart of FIG. 3 for any number of wells, e.g., a single well, tens, hundreds or thousands of wells.

While the well performance monitor (160) is shown at a well site, in some embodiments, the well performance monitor (160) or other components in FIG. 1 may be remote from a well site. For example, the well performance monitor (160) may be located at a central location, where reservoir engineers and production engineers coordinate the operation of the wells. In some embodiments, the well performance monitor (160) is implemented as part of a software platform for the data acquisition system (126). The software platform may obtain data acquired by a control system as inputs, which may include multiple data types from multiple sources. The software platform may aggregate the data from these systems in real time for rapid analysis. In some embodiments, the data acquisition system (126) and the well performance monitor (160), and/or a user device coupled to one of these systems may include a computer system that is similar to the computer system (502) described below with regard to FIG. 5 and the accompanying description.

While FIG. 1 shows various configurations of hardware components and/or software components, other configurations may be used without departing from the scope of the disclosure. For example, various components in FIG. 1 may be combined to create a single component. As another example, the functionality performed by a single component may be performed by two or more components.

Turning to FIG. 2, an example of an orifice performance curve (200) in accordance with one or more embodiments is shown. The orifice performance curve may be specific to a particular orifice plate and may be provided by the manufacturer of the orifice plate. As mentioned above, these orifice curves are derived from the equation which is associated with the orifice plate of the flow rate sensor, provided by the vendor of the orifice plate. An orifice performance curve may be used to convert between a differential pressure (x-axis) and a rate of fluid flow (y-axis). The conversion from differential pressure to rate of fluid flow may be used when the corresponding orifice plate is operated as a flow meter. In other words, based on a measured differential pressure, the corresponding actual rate of fluid flow may be obtained. The conversion from rate of fluid flow to differential pressure may be used to facilitate the adjustment of the rate of fluid flow of a well. Assume, for example, that a production engineer specifies and adjustment of the rate of fluid flow to a target rate. To make the adjustment, the target differential pressure corresponding to the target rate may be obtained using the orifice performance curve. A well operator may subsequently operate a choke to adjust the restriction of the flow while monitoring the measured differential pressure. The actual rate of fluid flow matches the target rate when the measured differential pressure matches the target differential pressure.

While the example of the orifice performance curve (200) is based on particular units (inches of water for the differential pressure, barrels per day for the rate of fluid flow), other units may be used without departing from the disclosure.

Further, while a single orifice performance curve is shown, multiple curves may be used, for example depending on the type of fluid. Specifically, the conversion between differential pressure and rate of fluid flow depends on the geometry of the orifice plate and the surrounding tubing, but also on the characteristics of the fluid, including parameters such as the specific gravity, density, and viscosity of the fluid. Accordingly, different orifice performance curves may be used for different fluids, even for the same orifice plate.

FIG. 3 shows a flowchart in accordance with one or more embodiments. One or more blocks in FIG. 3 may be performed by one or more components (e.g., well performance monitor (160) as described in FIG. 1). While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

Turning to FIG. 3, a method for operating wells at optimum rates using orifice performance curves, in accordance with one or more embodiments, is shown.

In Block 302, in one or more embodiments, a database is established. The database may store orifice performance curves for the wells to be monitored for compliances. The database may be generated by an administrative entity, e.g., one or more production engineers.

In Block 304, in one or more embodiments, the database is reviewed for completeness. The review may involve verifying that the orifice performance curves required for monitoring the wells are present in accordance to the actual orifice meter installed.

In Block 306, in one or more embodiments, based on the review of Block 304, a determination is made whether all wells to be monitored are present in the database. If one or more wells are missing, the execution of the method may proceed with Block 308. If all wells are found to be present, the execution of the method may directly proceed with Block 310.

In Block 308, in one or more embodiments, the database is revised. Revising the database may involve adding the orifice performance curves for wells not currently present in the database.

The operations of Blocks 304-308 may be periodically performed to ensure that orifice performance curves are present for all wells to be monitored. The database may thus remain current, even when wells are added or removed from production.

In Block 310, in one or more embodiments, target rates of fluid flow are obtained for each of the wells to be monitored. A target rate for a well may be initially set by a reservoir engineer, e.g., based on known or assumed characteristics of the reservoir. Subsequently, the target rate may be kept constant or may be updated, e.g., based on production considerations. Target rates may be individually updated, or alternatively a global adjustment to all target rates may be implemented. For example, target rates for all wells may be set to a particular value to meet a production target, or target rates for all wells may be adjusted by a particular percentage. A target rate of fluid flow may be for injection or production.

Next, the target differential pressure, i.e., the differential pressure corresponding to the target rate, is obtained for each of the wells. The target differential pressure for a well may be obtained by applying the orifice performance curve for that well to the target rate.

In Block 312, in one or more embodiments, based on the operations of Block 310, a determination is made whether target differential pressure values could be obtained for all wells. If one or more differential pressure values are missing, the execution of the method may proceed with Block 314. If all differential pressure values are found to be present, the execution of the method may directly proceed with Block 316.

In Block 314, in one or more embodiments, the missing differential pressure value(s) is/are obtained. The missing differential pressure value(s) may be entered by a production engineer. Further, execution of Block 314 may trigger an updating of the database (Block 308) to ensure that the missing differential pressure value(s) is/are available for future executions of the method.

The following operations (Blocks 316-320) are performed to monitor each of the wells for noncompliance, and to either bring a non-compliant well into compliance by executing the operations necessary to bring the non-compliant well into compliance, or to facilitate bringing the non-compliant well into compliance by providing instructions for bringing the non-compliant well into compliance.

In Block 316, in one or more embodiments, the target differential pressure for each well is communicated to the well operator for application at the well. The target differential pressure may be manually communicated, e.g., by a production engineer, to a well operator.

In Block 318, in one or more embodiments, a test is performed to determine whether all wells are compliant. The test may be performed, separately for each well, based on a deviation of the actual rate of fluid flow from the target rate of fluid flow. If the deviation exceeds a predetermined or pre-set threshold, the well may be considered non-compliant. The well may otherwise be considered compliant. The predetermined threshold may be set to, for example, +/−10% of the target rate, or to any other absolute or relative value.

In one or more embodiments, the comparison needed to determine compliance or non-compliance is performed based on the differential pressures corresponding to the rates of fluid flow. Specifically, the measured differential pressure corresponding to an actual rate of fluid flow is compared to the target differential pressure corresponding to the target rate of fluid flow.

The test may be performed by a well operator. The well operator may obtain a measured differential pressure from the well and may compare it to the target differential pressure received from the production engineer.

If a well is found to be non-compliant, the execution of the method may proceed with Block 320. If all wells are found to be compliant, the execution of the method may proceed with Block 322.

In Block 320, the non-compliant well is brought into compliance by identifying and addressing the issues of non-compliance. The non-compliance may result from an adjustment of the target rate of fluid flow. The non-compliance may also be a result of changing well characteristics. In one embodiment, the non-compliance is addressed by adjusting the choke of the well until compliance is reached. Specifically, the choke may be adjusted until the measured differential pressure substantially (i.e. within a tolerance window) matches the target differential pressure. The adjustment may be performed by the well operator. If the adjustment does not result in compliance, the well may be flagged for further investigation of technical issues, etc.

A system in accordance with one or more embodiments may either perform the adjustment, or may facilitate the adjustment. The adjustment is facilitated if the system provides instructions to perform the adjustment, whereas the actual adjustment is performed by a third party, e.g., an operator of the well.

In Block 322, one or more well parameters are documented. Well parameters such as the actual rate of fluid flow, the measured differential pressure, the wellhead pressure, and/or other parameters may be documented. The well parameters may be documented over time, and plots may be generated. Examples are provided in FIGS. 4A and 4B.

Various operations of the flowchart of FIG. 3 may be repeatedly performed over time, e.g., in a loop. Accordingly, the system and method as described may continuously keep the wells at optimum rated in an automated manner.

Figure 4A:
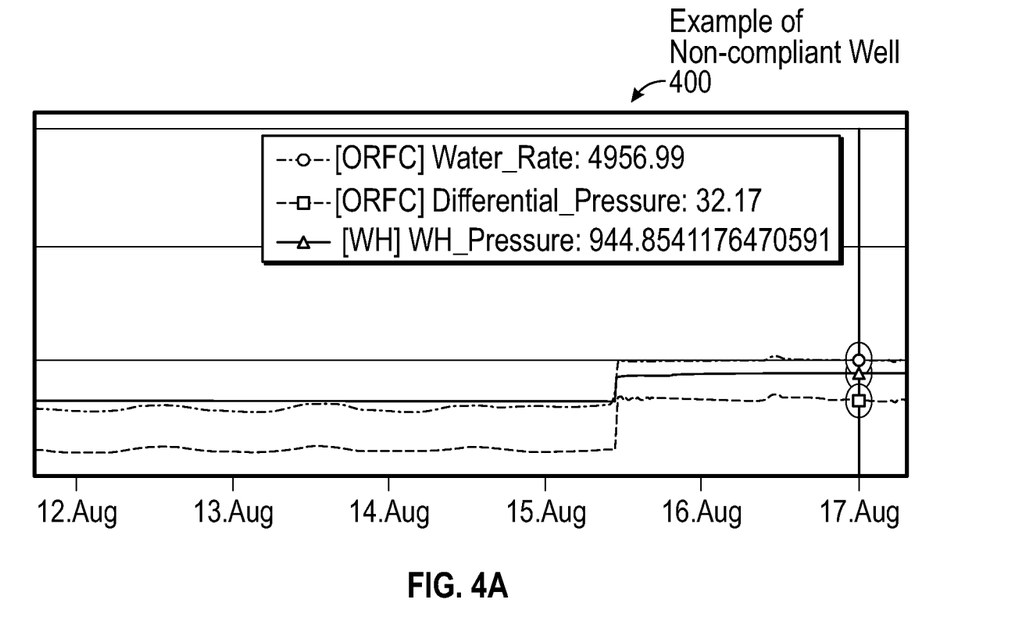
FIG. 4A shows an example of a non-compliant well in accordance with one or more embodiments.

Turning to FIG. 4A, an example (400) of a non-compliant well in accordance with one or more embodiments is shown. In the example, assume that the target production rate is 10,000 barrels per day. However, as the graph shows, the well was operating at approximately ~5,000 barrels per day at an orifice differential pressure of ~32.

Figure 4B:
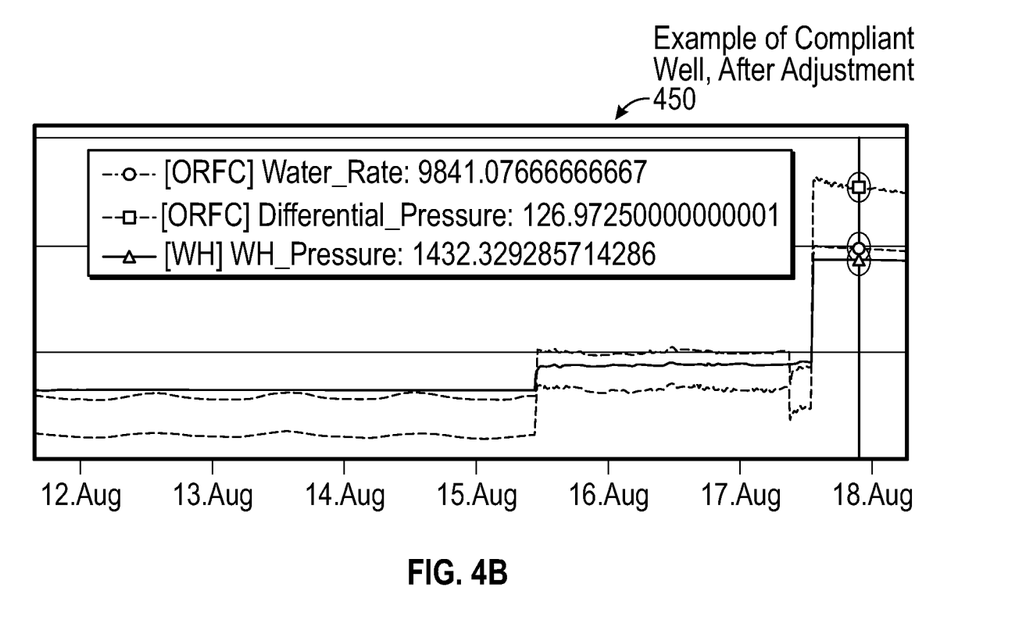
FIG. 4B shows an example of a compliant well, after adjustment, in accordance with one or more embodiments.

Turning now to FIG. 4B, an example (450) of a compliant well, after adjustment, in accordance with one or more embodiments is shown. In the example, assume that the target production rate is 10,000 barrels per day. As the graph shows, the well initially fails to produce at the target production rate. Inspection of the orifice performance curve (FIG. 2) suggests that an orifice differential pressure of 130 would be necessary to achieve a production rate of 10,000 barrels per day. The orifice differential pressure is adjusted to ~130, which results in an actual production rate of ~10,000 barrels per day.

Figure 5:
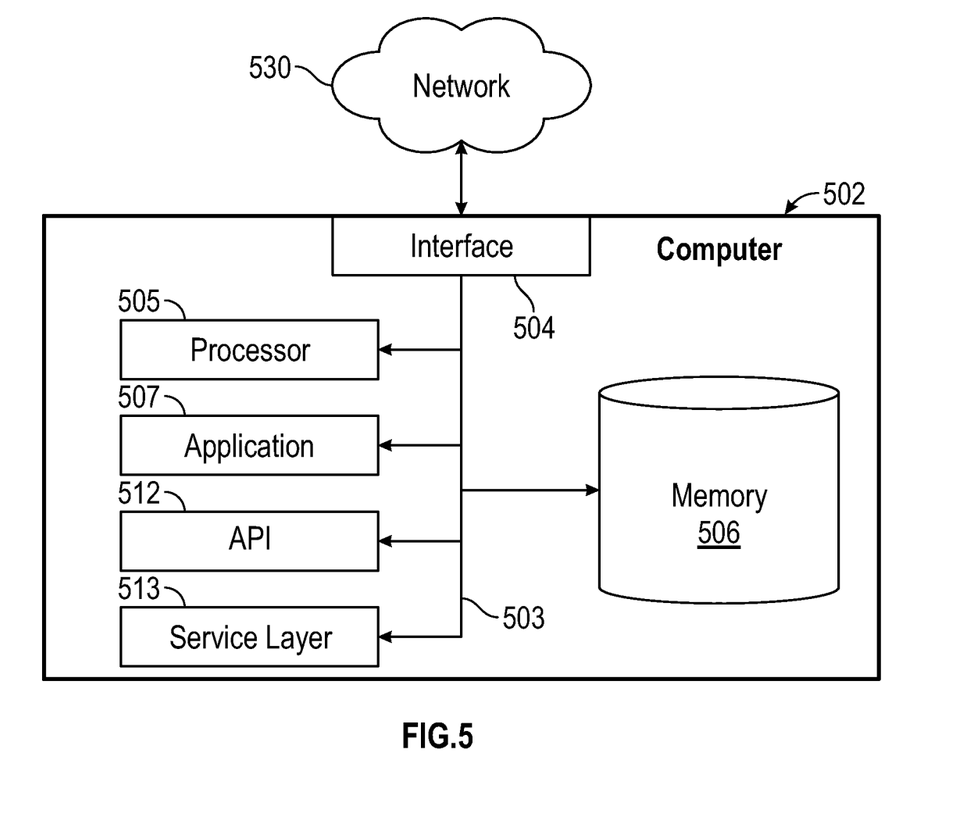
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method for operating a plurality of wells equipped with orifice plates, the method comprising:
   obtaining, for each of the plurality of wells, a target rate of fluid flow;
   calculating, for each of the plurality of wells, a corresponding target wellhead differential pressure,
      wherein the target wellhead differential pressure is defined across an orifice plate disposed at a surface of each of the plurality of wells, and
      wherein the target wellhead differential pressure is calculated based on the target rate of fluid flow using orifice performance curve equations stored in a database, and the orifice performance curve equations are associated with each of the plurality of wells;
   measuring an actual wellhead differential pressure with a surface pressure sensor,
      wherein the actual wellhead differential pressure is measured across the orifice plate disposed at the surface of each of the plurality of wells;
   obtaining, for each of the plurality of wells, a deviation value equal to the difference between the target wellhead differential pressure and the actual wellhead differential pressure;
   monitoring each of the plurality of wells for noncompliance, wherein noncompliance is determined based on the deviation value exceeding a predetermined threshold;
   determining, based on the deviation value and the performance curve equations associated with a non-complying well of the plurality of wells, a choke setting to bring the non-complying well into compliance; and
   bringing the non-compliant well of the plurality of wells into compliance by adjusting the choke associated with the non-compliant well according to the determined choke setting.

2. The method of claim 1, further comprising repeating the monitoring the plurality of wells for non-compliance over time.

3. The method of claim 2, further comprising documenting the measured wellhead differential pressure over time.

4. The method of claim 1, wherein the plurality of wells are injection wells.

5. The method of claim 1, wherein obtaining, for each of the plurality of wells, a target rate of fluid flow comprises obtaining a global adjustment of the target rate of fluid flow across the plurality of wells.

6. A system for operating a plurality of wells equipped with orifice plates, the system comprising:
   a well performance monitor configured to operate the plurality of wells, the well performance monitor comprising:
      a database storing a plurality of orifice performance curve equations, wherein the orifice performance curve equations are associated with for the plurality of wells; and a processor configured to:
- obtain, for each of the plurality of wells, a target rate of fluid flow;
- calculate, for each of the plurality of wells, a corresponding target wellhead differential pressure,
  - wherein the target wellhead differential pressure is defined across an orifice plate disposed at a surface of each of the plurality of wells, and
  - wherein the target wellhead differential pressure is calculated based on the target rate of fluid flow using orifice performance curve equations stored in a database;
- obtain, using a surface pressure sensor, an actual wellhead differential pressure,
  - wherein the actual wellhead differential pressure is measured across the orifice plate disposed at the surface of each of the plurality of wells;
- obtain, for each of the plurality of wells, a deviation value equal to the difference between the target wellhead differential pressure and the actual wellhead differential pressure;
- monitor each of the plurality of wells for noncompliance,
  - wherein noncompliance is determined based on the deviation value exceeding a predetermined threshold;
- determine, based on the deviation value and the performance curve equations associated with a non-complying well of the plurality of wells, a choke setting to bring the non-complying well into compliance; and
- facilitate bringing the non-compliant well of the plurality of wells into compliance by adjusting the choke associated with the non-compliant well according to the determined choke setting.

7. The system of claim 6, further comprising, for each of the plurality of wells:
an orifice flowmeter comprising the orifice plate.

8. The system of claim 7, further comprising, for each of the plurality of wells:
a data acquisition system configured to obtain, from the pressure sensor, the measured differential pressure across the orifice plate.

9. The system of claim 6, wherein each of the plurality of wells comprises an individual choke:
configured to adjustably restrict the actual rate of fluid flow.

10. The system of claim 6, wherein the processor is further configured to repeat the monitoring the plurality of wells for non-compliance over time.

11. The system of claim 10, wherein the processor is further configured to document the measured wellhead differential pressure over time.

12. The system of claim 6, wherein the plurality of wells are injection wells.

13. The system of claim 6, wherein obtaining, for each of the plurality of wells, a target rate of fluid flow comprises obtaining a global adjustment of the target rate of fluid flow across the plurality of wells.

14. A non-transitory machine-readable medium comprising a plurality of machine-readable instructions executed by one or more processors, the plurality of machine-readable instructions causing the one or more processors to perform operations comprising:
- obtaining, for each of the plurality of wells, a target rate of fluid flow;
- calculating, for each of the plurality of wells, a corresponding target wellhead differential pressure,
  - wherein the target wellhead differential pressure is defined across an orifice plate disposed at a surface of each of the plurality of wells, and
  - wherein the target wellhead differential pressure is calculated based on the target rate of fluid flow using orifice performance curve equations stored in a database, and the orifice performance curve equations are associated with each of the plurality of wells;
- measuring an actual wellhead differential pressure with a surface pressure sensor,
  - wherein the measured wellhead differential pressure is measured across the orifice plate disposed at the surface of each of the plurality of wells;
- obtaining, for each of the plurality of wells, a deviation value equal to the difference between the target wellhead differential pressure and the actual wellhead differential pressure;
- monitoring each of the plurality of wells for noncompliance, wherein noncompliance is determined based on the deviation value exceeding a predetermined threshold;
- determining, based on the deviation value and the performance curve equations associated with a non-complying well of the plurality of wells, a choke setting to bring the non-complying well into compliance; and
- bringing the non-compliant well of the plurality of wells into compliance by adjusting the choke associated with the non-compliant well according to the determined choke setting.

15. The non-transitory machine-readable medium of claim 14, wherein the operations further comprise repeating the monitoring the plurality of wells for non-compliance over time.

16. The non-transitory machine-readable medium of claim 15, wherein the operations further comprise documenting the measured wellhead differential pressure over time.

17. The non-transitory machine-readable medium of claim 14, wherein the plurality of wells are injection wells.

* * * * *